United States Patent [19]

Kiowski et al.

[11] 3,902,161

[45] Aug. 26, 1975

[54] DIGITAL SYNCHRONIZER SYSTEM FOR REMOTELY SYNCHRONIZING OPERATION OF MULTIPLE ENERGY SOURCES AND THE LIKE

[75] Inventors: John W. Kiowski; John T. Bobbitt, both of Houston, Tex.

[73] Assignee: Petty-Ray Geophysical, Inc., Houston, Tex.

[22] Filed: July 15, 1974

[21] Appl. No.: 488,553

Related U.S. Application Data

[63] Continuation of Ser. No. 175,471, Aug. 27, 1971.

[52] U.S. Cl. .............................. 340/147 SY; 325/58

[51] Int. Cl.$^2$ ........................ H04Q 9/00; H04B 7/00

[58] Field of Search ............. 340/147 SY, 170, 171; 325/58; 178/69.5; 179/15 BS, 15 BP

[56] References Cited

UNITED STATES PATENTS

| | | | |
|---|---|---|---|
| 3,238,459 | 3/1966 | Landee | 340/170 X |
| 3,337,850 | 8/1967 | Loumeau | 340/170 X |
| 3,551,814 | 12/1970 | McCormick et al. | 179/15 BX X |
| 3,593,160 | 7/1971 | Moore | 179/15 BS X |
| 3,648,173 | 3/1972 | Elliott | 325/321 X |

FOREIGN PATENTS OR APPLICATIONS

| | | |
|---|---|---|
| 1,140,102 | 1/1969 | United Kingdom |
| 1,150,199 | 4/1969 | United Kingdom |
| 1,178,856 | 1/1970 | United Kingdom |
| 1,207,201 | 9/1970 | United Kingdom |
| 1,224,682 | 10/1971 | United Kingdom |

*Primary Examiner*—Donald J. Yusko
*Attorney, Agent, or Firm*—Arnold, White & Durkee

[57] ABSTRACT

Remote triggering is provided for one or more receiving stations by phase encoding a series of binary 1 and 0 bits on a tone, and transmitting them to the receiving stations via radio transmission links. Control at the receiving stations is provided by detecting and reproducing the series of binary 1 and 0 bits by phase demodulation to provide the control time break. The tone transmission (which is common to all receiving stations) is used as the basis for respective clocks, which are reconstituted at each receiving station from the originally transmitted tone frequency. The system can determine the clock pulses arriving at separate receiving stations within a single clock period, and accordingly, accuracy of operation is possible to within a clock period.

6 Claims, 9 Drawing Figures

INVENTORS
JOHN T. BOBBITT
JOHN W. KIOWSKI
BY
Robert G. Clay
ATTORNEY

INVENTORS
JOHN T. BOBBITT
JOHN W. KIOWSKI

BY

Robert H. Clay

ATTORNEY

INVENTORS
JOHN T. BOBBITT
JOHN W. KIOWSKI

BY
Robert H. Clay
ATTORNEY

DIGITAL SYNCHRONIZER SYSTEM FOR REMOTELY SYNCHRONIZING OPERATION OF MULTIPLE ENERGY SOURCES AND THE LIKE

This is a continuation of application Ser. No. 175,471, filed Aug. 27, 1971.

BACKGROUND OF THE INVENTION

1. Field

The present invention relates to circuits for synchronizing single or multiple source operation, and particularly to a digital system synchronizer for remotely synchronizing the operation of multiple, electrically-operable devices.

2. Prior Art

Prior art systems for synchronizing single or multiple seismic signal generating sources typically employ means for transmitting a tone, whereupon the end of the tone transmission is detected and interpreted as a synchronizing pulse. However, radio link bandwidths limit the useable tone frequencies to wavelengths equal to required synchronization time errors, which causes prior art synchronizing systems to be quite marginal in operation.

SUMMARY OF THE INVENTION

The present invention provides digital circuit means for transmitting by radio a coded sequence which can be decoded with high resolution (of ±½ millisecond), over average communication tone bandwidths of 500 Hz to 2500 Hz. The decoded sequence is used at each of a plurality of receiving stations, to provide precise triggering of electronically-operable devices, such as seismic signal generators.

More particularly, the radio tone being transmitted which may be for example 1250 Hz, is modulated by a bi-phase method, to generate an 8 bit binary control code wherein opposite polarities, of the 1250 Hz tone represent 1 and 0 bits, respectively.

The transmitted modulated tone is received and demodulated at the receiving stations, and the character group of the transmitted control code is clocked into respective shift registers, where it is compared bit by bit with a synchronization address code so as to provide a time zero pulse when the codes absolutely match. The comparator may include a decode thumb wheel input for variable binary coded address, as well as a fixed logic for the fixed binary coded group.

The clocks which shift each information into the shift register are derived from the originally transmitted 1250 Hz carrier, and are reconstituted by a phase locked loop. Thus, all receiving stations have their clocks locked in phase with the single, originally transmitted tone, and accordingly, all are precisely synchronized in real time. To insure that all receiving stations begin decoding in time synchronization, a phasing and sync tone is transmitted on the carrier preceding each transmission of the control code.

DESCRIPTION OF THE PREFERRED EMBODIMENTS

Figure 1:
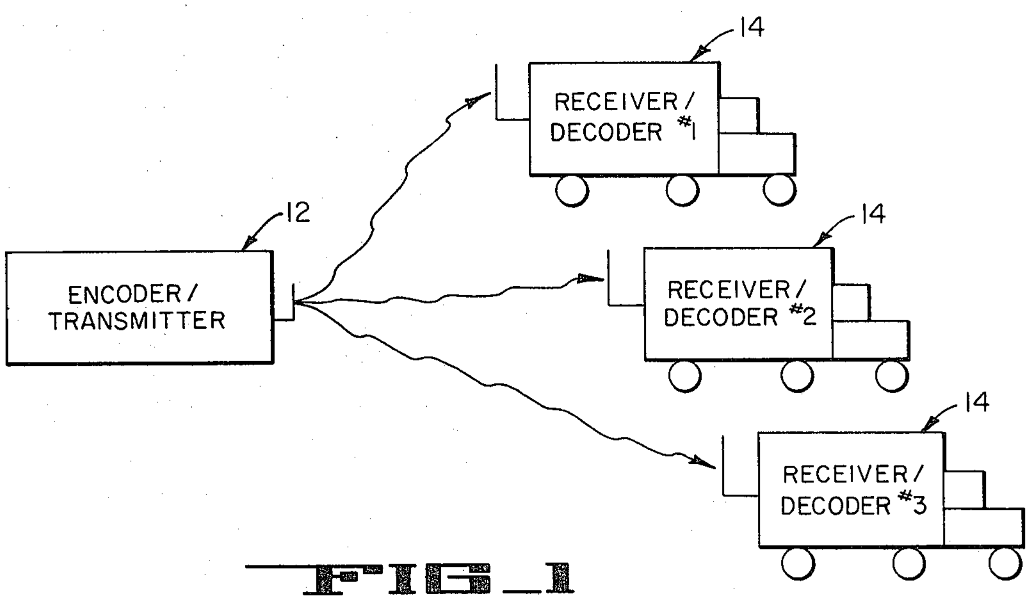
FIG. 1 is simplified block diagram illustrating the invention system employed in an overall seismic exploration system.

FIG. 1 illustrates one field application of the invention system, wherein an encoder/transmitter device 12 constitutes a remotely located master instrumentation system for encoding a binary series of 1 and 0 bits onto a carrier tone. The code is thus transmitted with the tone to a plurality of receiving stations 14, each of which includes a receiver/decoder device. By way of illustration only, the invention is herein described with reference to controlling the operation of a multiple number of seismic sources. However, the invention system may be utilized in any application requiring the precise synchronization of operation of remotely situated, electrically operable devices.

Figure 2:
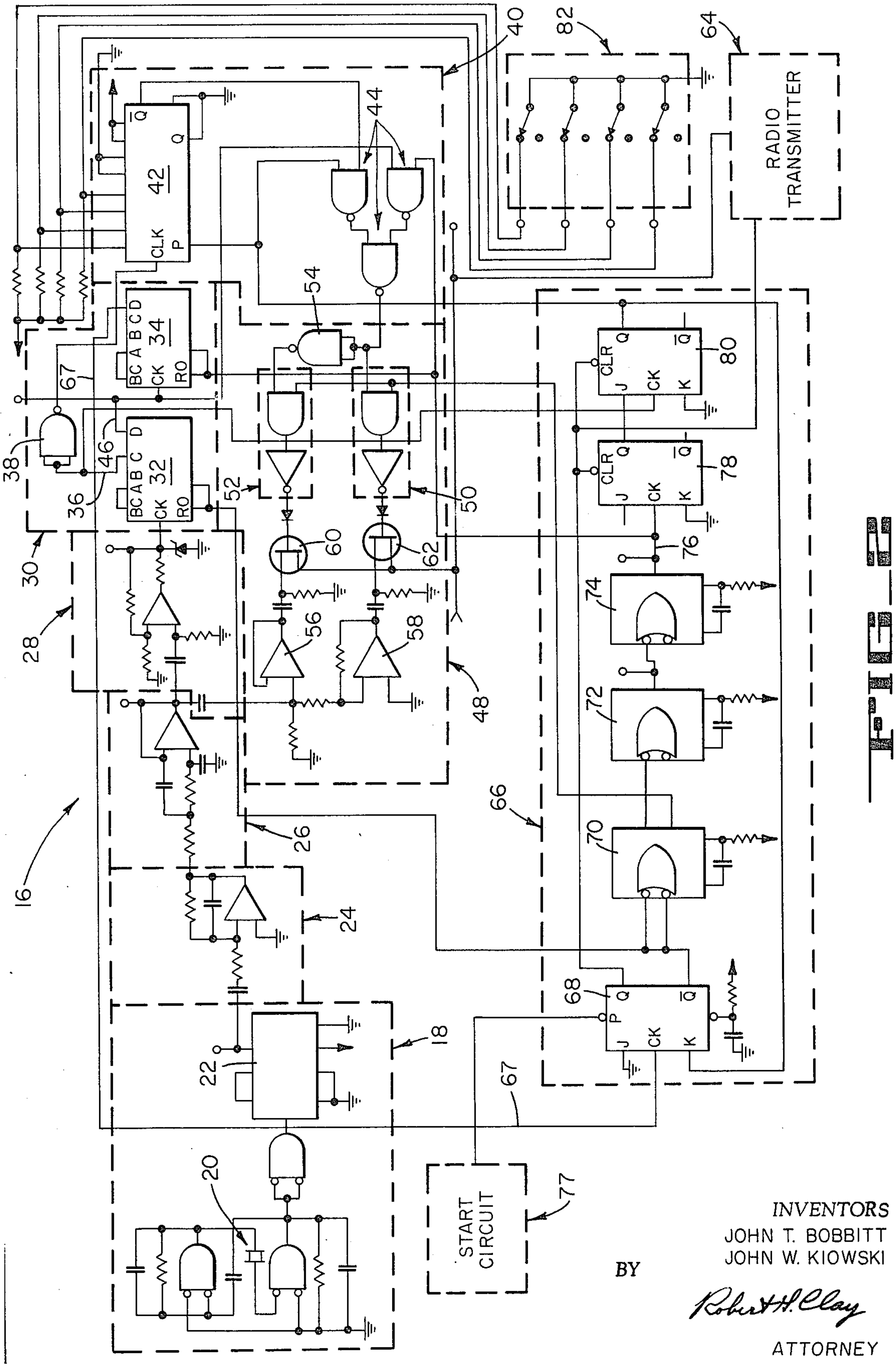
FIGS. 2 and 3 are block and schematic diagrams illustrating the encoder and decoder circuits respectively, in accordance with the invention.

Referring to FIG. 2, there is shown a preferred encoder circuit 16 of the invention synchronizer system. To facilitate the description, the schematic is divided into various blocks, whereby select integral portions of the schematic may be generally referred to. Furthermore although specific frequencies, binary codes, etc., are described herein with reference to the invention circuits to facilitate the description thereof, it is to be understood that same are utilized by way of description only, and may be modified as required by the particular application.

Accordingly, with reference to FIG. 2, a clock generator 18 is formed of a crystal oscillator 20 which includes associated circuits, and a divider circuit 22, and delivers a selected transmitter frequency of, for example, 1.25 kHz. In this example, the crystal oscillator delivers a 10 kHz signal to a divider circuit 22, which divides by 8 to provide the 1.25 kHz frequency signal. Obviously, other crystals may be utilized to provide a different transmitter frequency, in keeping with transmitter bandwidth requirements.

The 1.25 kHz signal from the divider circuit 22 is delivered to an amplifier 24, of selected gain, which provides, for example, a ± 10 volt signal output in the form of a symmetrical square wave. The output from amplifier 24 is delivered to a square-to-sine wave filter 26, which includes filter means with, for example, 12 db octave roll-off at 1.25 kHz. The filter 26 provides a sine wave from the square wave signal delivered via the amplifier 24.

The sine wave is introduced from the square-to-sine wave filter 26 to a sine-to-square wave converter 28, which provides a large gain of the order of, for example, 2000. Due to the large gain, the converter 28 operates as a zero crossing detector, to generate a square wave with no phase shift between it and the sine wave from filter 26.

The 1.25 kHz square wave is then introduced from the converter 28 to a clock divider 30, defined by a shift counter 32 and a character counter 34. The shift counter divides the square wave input by 8 to provide a shift clock (on line 36) which is delivered via a NAND gate 38 to a data logic means 40, and particularly to a shift register 42 thereof. In addition, the square wave is divided by 16 via the shift counter 32, to provide (on line 46) a character rate clock to the character counter 34, as well as to a plurality of date logic gates 44 of the data logic circuit 40. The character counter 34 divides the output of the shift counter 32 by 16, thereby providing a count of the number of characters being transmitted. Note that the circuit provides for counting twice the number of characters necessary, e.g. 16 rather than 8, before turning off the sequence of transmitted characters. This allows for zeros to be transmitted after the selected code characters for 8 character periods.

The data logic gates 44 are coupled to a polarity selector 48, and particularly to a first level converter 50, and a second level converter 52 via a NAND gate 54. The sine wave of 1.25 kHz is further introduced from the filter 26 to the polarity selector 48, and particularly to a non-inverting buffer 56 and an inverter amplifier 58 of unity gain. The outputs from the buffer 56 and amplifier 58 are coupled to respective FET switches 60, 62 which are controlled by the level converters 52, 50 respectively.

In polarity selector 48, non-inverting buffer 56 buffers the sine wave filter 26 into the FET switch 60. The inverter amplifier 58 provides the same amplification of the sine wave signal as does the buffer 56, but does so 180° out-of-phase with the sine wave output of buffer 56. Amplifier 58 buffers the 180° out-of-phase sine wave into the FET switch 62. The level converters 50, 52 determine which of the FET switches 60 or 62 is operating, in response to the signals delivered via the data logic gates 44 of the data logic circuit 40. The resulting code tone is delivered via the FET switches 60, 62 to transmitter means 64 for subsequent transmission.

Figures 4A, 4B, 4C, 4D, 4E, 4F:
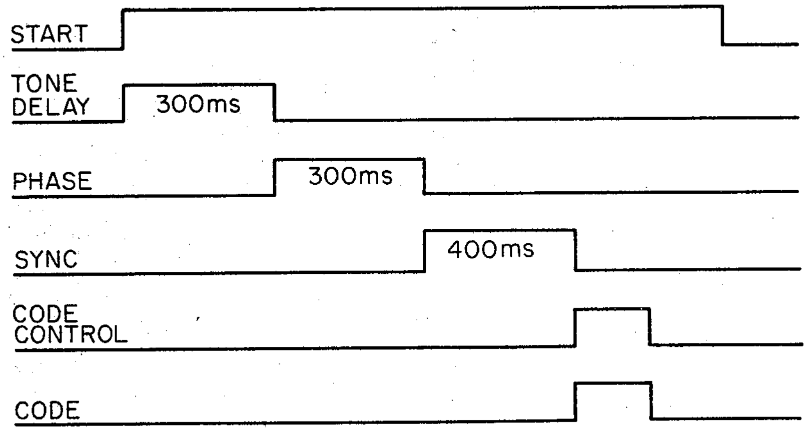
FIGS. 4A thru 4F are timing diagrams depicting a series of waveforms generated by the invention circuit of FIG. 2.

The output from the character counter 34, which counts the number of characters being transmitted, is delivered to a transmitter timing circuit 66. More particularly, a character count line 67 is coupled to start flip-flop 68 which is used to terminate the transmitter timing sequence. At such time as the start flip-flop 68 is set, (FIG. 4A) a tone delay one-shot 70 is triggered and provides a 300 millisecond pulse (FIG. 4B). When the one-shot 70 goes low, it triggers a phase one-shot 72 for 300 milliseconds (FIG. 4C). When one-shot 72 goes low it in turn triggers a sync one-shot 74 for a time interval of 400 milliseconds (FIG. 4D). The sync one-shot output is introduced to line 76.

To digress for a moment, when the start flip-flop 68 is set as by means of the local or remote start circuit 77, it triggers the transmitter means 64 on. However, during the time that the tone delay one-shot 70 is on, no tone is sent to the transmitter means 64. This is to provide a delay during which the squelch circuits of the receiving stations are allowed to operate.

When the phase one-shot 72 is triggered for 300 milliseconds, the non-inverted tone from tone buffer 56 is transmitted via the FET switch 60, by the transmitter means 64. That is, the unmodulated 1.25 kHz tone is transmitted for 300 milliseconds. Then the sync one-shot 74 triggers for 400 milliseconds to enable, via the line 76 and the data logic gates 44, the transmitter means 64 to send the tone modulated with a character sequence composed of alternate 1 s and 0 s at 78.125 Hertz. During the sync one-shot interval, every 0 on line 46 gates the non-inverted tone from the buffer 56 to the transmitter means 64, and ever 1 on line 46 enables the 180° inverted tone from amplifier 58 to the transmitter means, for transmission. At the end of the sync one-shot pulse, a code control flip-flop 78 is clocked on by the trailing edge of the 400 millisecond sync pulse. The code control flip-flop 78 enables a code flip-flop 80 to set on the first shift clock delivered via the shift counter 32 on line 36.

Setting the code flip-flop 80 removes the preset condition of the shift register 42, allowing the 8 characters of the control code, which have been stored in the shift register 42, to be shifted out, which in turn creates a 180° phase shift in the tone for each logical 1.

Thus, in accordance with the encoder circuit 16, FIG. 2, a 1.25 kHz tone is modulated with 8 characters which form a binary code of 1 s and 0 s. The 8 characters are divided into two groups of four and may be considered as two binary coded numbers. One group is fixed to a binary coded number of 12. The other group is programmable, for example, by a thumb-wheel 82 input operable by the operator, which provides 10 combinations of coding. The thumbwheel 82 is a conventional binary coded decimal (BCD) thumbwheel device of the type manufactured by the companies, EECO or DIGITRAN.

Character times are derived from a countdown of the 1.25 kHz basic clock, and each character comprises 8 basic clock times. Therefore a character code of alternate 1 s and 0 s (in this illustrated example) represents a frequency of 78.125 Hz as previously mentioned. The 1.25 kHz tone is modulated with the character rates by a bi-phase apparatus (polarity selector 48, etc.) such that a character representing a 1 produces one polarity of the 1.25 kHz tone, and a 0 produces the opposite polarity of the tone. In such manner, a modulated tone is generated wherein opposite polarities of the tone represent 1 and 0 bits of the code, respectively.

As mentioned, the polarity of the sub-carrier is switched at zero crossing points so that transients are minimized. The thus transmitted character group is decoded at the remote receiving devices as further described with reference to FIG. 3.

Figure 3:
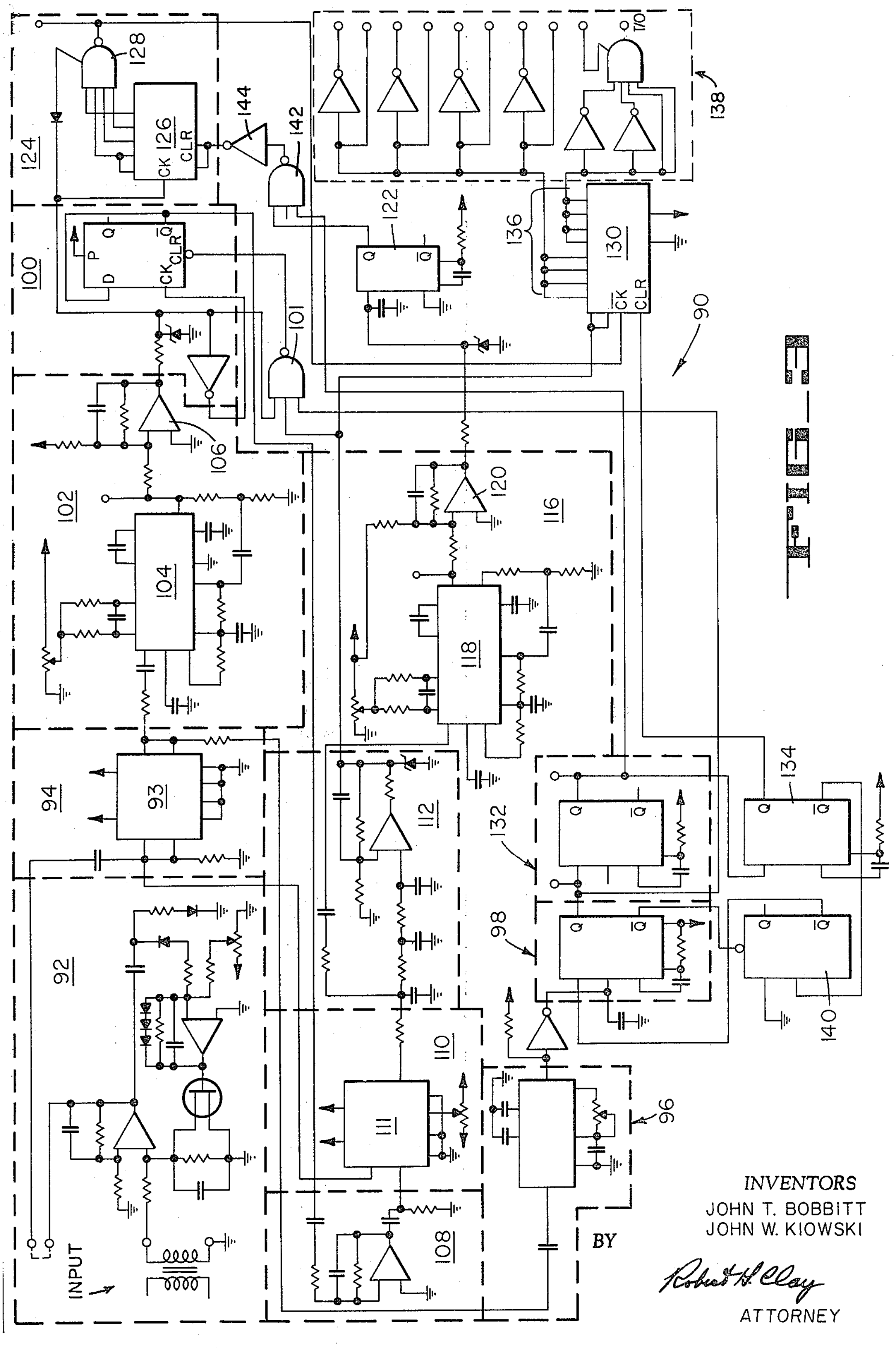

Referring accordingly to FIG. 3, there is shown a decode circuit 90 of the invention combination, wherein the schematic is divided into block form to facilitate description of the circuits. The decode circuit 90 therefore includes an automatic gain control (AGC) amplifier 92 of generally conventional design, used to maintain a constant voltage level output. The output from the AGC amplifier 92 is fed to a multiplier 93 used as a frequency doubler circuit (94). Thus, a 1.25 kHz input, which is, as explained above, at times phase reversed, is fed to the frequency doubler circuit 94 wherein squaring the signal provides a 2.5 kHz sine wave output with any phase reversals removed.

As previously mentioned, the tone transmitted during the phase one-shot 72 pulse (FIG. 4C and FIG. 2) is a pure, unmodulated tone. When this tone is received and amplified, it is delivered through the frequency doubler circuit 94 of FIG. 3, to a tone detector circuit 96, formed of a phase locked loop, which, upon detecting the presence of the 2.5 kHz tone, triggers a phase one-shot 98 of 200 milliseconds duration. This in turn enables the re-setting of a phase flip-flop 100 via a NAND gate 101.

At the same time, the 2.5 kHz sine wave from frequency doubler circuit 94 is also introduced to a clock generator 102, and more particularly to a phase locked loop 104. Loop 104 is running at 2.5 kHz, and accordingly, the input signal and the loop signals are locked by action of the phase locked loop 104 with 90° phase shift, but in synchronism. The output from the phase locked loop 104 is then delivered to an amplifer circuit 106. The 2.5 kHz square wave output of clock generator 102 is delivered to the phase flip-flop 100 of previous mention, where it is divided by 2 to provide a clean 1.25 kHz clock which is subsequently used to demodulate the incoming signal from the encoder/transmitter circuit of the invention system. To this end, the 1.25 kHz square wave clock is delivered to an amplifier circuit 108, wherein the square wave is amplified and made bi-polar by action of the amplifier circuit 108. This reconstituted 1.25 kHz clock is then fed to a phase demodulator circuit 110 comprising a multiplier 111, where it is multiplied by the newly incoming 1.25 kHz sine wave newly introduced from the AGC amplifier 92. The resulting output is fed to a filter and amplifer network 112, which generates a zero voltage output representing a 0 if the inputs to the demodulator 110 are out of phase, and some positive voltage representing a 1, if the inputs to the demodulator 110 are in phase. In the event the inputs are in phase (representing a 1), and during the 200 milliseconds of the phase period of FIG. 4C, then the phase flip-flop 100 is reset via the NAND gate 101, as previously noted, causing the two inputs to the demodulator 110 to go out of phase, thereby phasing the system properly.

The outputs from the phase demodulator 110 are fed to a sync generator 116 which is free running at 78.125 Hertz. The sync generator 116 includes a phase locked loop 118 and an amplifier 120 coupled thereto, in the manner of the clock generator 102. Upon receiving the sync characters which comprise the alternate 1 s and 0 s from the transmitter means 64 of FIG. 2, the phase locked loop 118 is synchronized 90° out of phase. The resulting 78.125 square wave delivered at the output of the sync generator 116 triggers a sync reset one-shot 122 which creates a sync reset pulse of approximately 100 nanoseconds duration, which is located approximately in the middle of each character, due to the 90° phase shift provided by the sync generator 116.

A register clock generator 124 formed of a divider network 126 and a NAND gate 128 also receives the reconstituted clock that is fed to the phase flip-flop 100. When the divider network 126 reaches all 1 s, the last of the 16 1 s are gated out via the NAND gate 128 to provide a 1-out-of-16 clock from the latter gate 128. The 1-out-of-16 clock is used to clock a serial register 130.

Returning now to the timing sequence of the phase one shot 98, at the end of 200 milliseconds pulse, a sync one shot 132 is triggered on. This enables the resetting of the register clock generator 124 divider network 126.

During the 400 millisecond sync time of one shot 132, the sync reset pulse one shot 122 is enabled and the divider network is accordingly set to the zero state on each reset pulse via NAND gate 142 and inverter 144. At the end of the 400 millisecond sync pulse, the sync reset pulse to 126 is disabled, leaving the register clock output from generator 124 occuring approximately in the middle of a character interval. Also at the end of the 400 millisecond sync pulse, a data one shot 134 is triggered which removes the clear input to the serial register 130 allowing the date characters from the filter and amplifier network 112 to be serially shifted into the serial register 130, where they are compared at parallel outputs 136 thereof by means of a comparison circuit 138. The predetermined control code has been preset into the comparison circuit, as for example, by a thumb wheel device such as 82 of FIG. 2. When the series of 8 characters in the serial register 130 matches absolutely with the preset values of the control code, a logic level is produced at the output of the comparison circuit, thus creating the pulse corresponding to time zero, i.e., T/O, for synchronized system operation.

A lock-out circuit comprising a lock-out flip-flop 140 is coupled to the data one shot 134 and inhibits the tone detector 96 from re-triggering the phase one shot 98 for a period of 400 milliseconds.

In operation, therefore, the transmitted character group of the control code is accordingly received at the remote devices, decoded via the circuit of FIG. 3, and is clocked into the serial register 130. Here it is compared with a preselected synchronization control code, which has been programmed as an input into comparator means 138 (which may, for example comprise a decode (BCD) thumbwheel for the programmable binary code group, and a fixed logic for the fixed binary coded group, as previously mentioned with reference to FIG. 2). The clocks which shift the information into the register 130 are derived from the 1.25 kHz carrier tone and are reconstituted by the phase locked loop 104. In this manner, all receiving stations have their clocks locked in phase with the transmitted carrier tone.

The carrier tone is demodulated by synchronous amplitude modulation detection. To regenerate the carrier without the polarity reversals, the carrier frequency is doubled via the frequency doubler 94. The output is AC coupled to remove the DC component, and then is fed into a phase locked loop 104 which generates a clean, reconstituted, 2.5 kHz squarewave signal. The standard phase flip-flop 100 is used to divide the signal by two to provide a clean 1.25 kHz signal, which is then used to synchronously demodulate the incoming signal via the amplifier 108 and phase demodulator 110.

The demodulator 110 is another integrated circuit multiplier in which the modulated carrier is multiplied with the unmodulated reconstituted carrier of previous mention. The output is filtered as via network 112 to remove most of the carrier, leaving the DC polarities representing the 1 s and 0 s of the character code. To ensure that all receiving stations encode in time synchronization, a phasing and sync tone is transmitted preceding each code transmission as previously described in FIG. 2. The phasing tone is transmitted first for approximately 300 milliseconds. The presence of the 1.25 kHz is sensed by the frequency sensitive tone detector 96 which enables the successive timing circuit to operate. The receiver circuits then begin a sequence of three states of operation.

The first is the phasing state in which the carrier tone is being transmitted in the polarity representing 0 s. The polarity of the demodulator 110 is checked and the polarity of the reconstituted carrier is changed if necessary to demodulate the incoming carrier in the proper phase. Next the receiver and transmitter automatically enter the second of the three states, which is a synchronizing state lasting for approximately 400 milliseconds. During this time the carrier is modulated with a polarity sequence representing alternate 1 s and 0 s. This signal is demodulated via demodulator 110 at the receiver and is reconstituted by the phase locked loop 118 of the sync generator 116. The phase locked loop 118 uses a multiplier as a phase detector and a VCO to produce a square wave of the same frequency of 78.125 Hz as the alternate 1 and 0 characters transmission and 90° out of phase.

The clocks which shift the character information into the eight bit serial register 130 are derived from counting down the 2.5 kHz signal from the frequency doubler 94. The output of the counter 126 is running at the exact character time rate and the entire counter is synchronized during the previously mentioned state two, with the output of the character generator. This produces clocks which are synchronized in all receiving stations and which fall near the center of each character time because of the 90° shift.

The system then goes into state three at which time the actual coded sequence is transmitted. Since all received clocks are in sync, when the last character of the group of eight in the control code enters the serial register 130, the comparator means 138 sees the proper code and all receive systems are enabled on the clock associated with the last or eighth code character. This time is identified as zero time, or as previously mentioned, T/O.

Thus, it may be seen that the invention system has a high degree of noise immunity for two reasons. First, the bi-phase modulation with moderate filtering of the demodulated output has high noise immunity because it is improbable that noise will cause a carrier phase reversal long enough to escape the filtering action. Second, the signals used for synchronization of clocks are derived from the transmitted signal and are all reconstituted by voltage controlled oscillators operating in phase locked loops. This produces clean waveforms of the same frequency as the average incoming frequency. Jitter and uncertainty due to noise in transmission is greatly reduced by the time constant of the phase locked loops. These time constants associated with filtering in the loops, assures that the voltage controlled oscillators lock on the average frequency and are relatively unaffected by instantaneous variations due to noise or modulation components.

Although the synchronizer system is shown herein with a radio transmission link coupling the encoder and decoder portions of the apparatus, it is to be understood that the encoder and decorder may be hand wired together in remote relationship. The invention further contemplates the use of telephone line connections extending across selected parts of the country to provide means for conveying the encoded signals to the decoder portion of the invention combination.

We claim:

1. A method of synchronizing the operation of a plurality of remotely - located, electrically-operable devices utilizing digital techniques comprising:

generating from at least one source a carrier tone of a single, selected frequency for transmission to said remote devices;

activating the timing circuitry within said devices in response to the detection by said devices of said carrier tone, thereby enabling said timing circuitry to process command signals;

modulating the carrier tone as it is being transmitted according to a multiple bit binary code so as to encode on said carrier tone a sequence of binary code command signals representing the synchronizing and control timing states respectively of operation of said remote device timing circuitry;

demodulating the carrier tone at said remote devices to reconstitute within said timing circuitry the synchronizing and control code binary command signals;

phase locking each device to the carrier tone in response to the synchronizing command signal in order to synchronize the subsequent operation of said timing circuitry; and comparing the control code with a preselected synchronization address code to provide time zero signals when the codes match.

2. The method according to claim 1 further including the steps of:

deriving in response to said synchronizing signal a storage entry clock signal in said timing circuitry which is time synchronized in all devices;

storing the reconstituted control code according to said derived synchronized clock signal;

comparing the stored control code bit sequence with a preselected synchronization address code;

providing a synchronized time zero signal at each device when an absolute comparison exists.

3. A method according to claim 1 wherein the carrier tone of selected frequency is phase modulated with a plurality of characters which comprise multiple binary coded numbers, one of said binary coded numbers being fixed and representing the synchronizing signal, and another being programmable and representing the code control signal.

4. A digital synchronizer system for remotely synchronizing the operation of a plurality of electrically-operable devices, comprising:

means for generating a carrier tone of selected frequency;

digital encoder means for phase encoding a series of binary 1 and 0 bits on the carrier tone in the form of reversals in the polarity of the tone;

said digital encoder means including polarity selector means coupled to the means for generating a carrier tone for modulating the carrier tone with a select character rate derived from the tone frequency;

radio communication means for conveying the carrier tone to be electrically-operable devices; and digital decoder means at each device disposed to act in response to receiving the conveyed carrier tone and further including, means for decoding the conveyed modulated carrier tone, shift register means for receiving the signals from said decoding means, means including a phase locked loop in each device for generating respective clocks from the carrier tone, said clocks being operatively coupled to respective shift register means to simultaneously clock the signals from said decoding means into the register means of each device and comparator means coupled to the register means to provide a time zero signal when the signals clocked into said register compare absolutely with a preselected synchronization address code.

5. A digital synchronizer system according to claim 4 wherein the polarity selector means includes means for forming a binary code of 1 and 0 bits to define at least a sync tone and a character code tone which are conveyed from the encoder means to the decoder means in selected sequence via the means for conveying.

6. A digital synchronizer system according to claim 4 wherein the means for generating a tone includes a crystal oscillator operatively coupled to square-to-sine wave filter means for generating a sine wave of selected frequency commensurate with said carrier tone; the encoder means comprise a clock divider coupled to the filter means to generate a shift clock and a character rate clock; data logic coupled to the shift clock and the character rate clock for determining a fixed and a programmable portion of the character code tone; said polarity selector means being coupled to the data logic and to the filter means for generating alternate 1 s and 0 s to define the sync tone and a selected sequence of 1 s and 0 s to define the character code tone, said polarity selector means being further coupled to the means for conveying; and timing circuit means coupled to the clock divider, to the data logic and to the polarity selector means, to control the conveying of the sync tone and the character code tone.

* * * * *